United States Patent [19]
Westberg et al.

[11] Patent Number: 5,982,168
[45] Date of Patent: Nov. 9, 1999

[54] HIGH PERFORMANCE TACHOMETER WITH AUTOMATIC TRIGGERING

[75] Inventors: John V. Westberg, Rockford; Timothy D. Joyce, Sycamore, both of Ill.

[73] Assignee: Auto Meter Products, Inc., Sycamore, Ill.

[21] Appl. No.: 09/023,622

[22] Filed: Feb. 13, 1998

Related U.S. Application Data

[63] Continuation of application No. 08/649,018, May 16, 1996.
[51] Int. Cl.⁶ ..................................................... G01P 3/42
[52] U.S. Cl. .................... 324/160; 324/166; 364/424.01; 364/565; 340/441
[58] Field of Search ............................. 324/143, 1–146, 324/160, 166, 170, 161, 163, 168, 169, 178; 364/424.01, 424.04, 560, 565, 566; 340/992, 441, 456, 466; 235/104

[56] References Cited

U.S. PATENT DOCUMENTS

| | | | |
|---|---|---|---|
| 3,818,342 | 6/1974 | Stevens | 324/169 |
| 3,822,402 | 7/1974 | Vest | 324/169 |
| 3,835,382 | 9/1974 | Weisbart | 324/161 |
| 3,906,437 | 9/1975 | Brandwein et al. | 340/945 |
| 3,921,946 | 11/1975 | Norton et al. | 246/182 |
| 3,950,700 | 4/1976 | Weisbart | 324/161 |
| 4,188,618 | 2/1980 | Weisbart | 340/201 |
| 4,236,215 | 11/1980 | Callahan et al. | 324/160 |
| 4,241,403 | 12/1980 | Schultz | 364/222.4 |
| 4,258,421 | 3/1981 | Juhasz et al. | 340/870.16 |
| 4,262,641 | 4/1981 | Mosley | 324/166 |
| 4,395,624 | 7/1983 | Wartski | 324/166 |
| 4,442,424 | 4/1984 | Shirasaki et al. | 340/462 |

(List continued on next page.)

FOREIGN PATENT DOCUMENTS 0 074 330 A1  6/1983  European Pat. Off. .
WO 89/12279  12/1989  WIPO .

OTHER PUBLICATIONS

"Microprocessor–Controlled Vehicle Performance Recorder," Manufacturing Technology Note, U.S. Army Materiel Command, Jul. 1986 (one page).

"Black Magic in '89 Lola Indycar," Autoweek, Jan. 30, 1989 (one page).

Product advertisement, published 1976, advertising several different tachometer models made by Autometer Proudcts Inc. Month not available.

Product advertisement, published 1983, advertising several different tachometer models made by Autometer Products Inc. Month not available.

Product advertisement, published 1984, advertising several different tachometer models made by Autometer Products Inc. Month not available.

Product advertisement, published 1991, advertising several different tachometer models made by Autometer Products Inc. Month not available.

Product advertisement including functional and display descriptions of tachometers made by Stack, Inc. Advertisement prepared in Oct. 1994, but products or information described are believed to have been publicly known or available before Aug. 31, 1994.

Product advertisement, advertising the "Eliminator" series tachometer made by VDO. The "Eliminator" series tachometer is believed to have been publicly known or available at least as early as Nov. 1992.

(List continued on next page.)

*Primary Examiner*—Jay Patidar
*Attorney, Agent, or Firm*—Arnold, White & Durkee

[57] ABSTRACT

A high performance tachometer with memory device electronically connected to an input signal. A triggering device autometrically indicates the start of a drag racing event and activates the memory device. The memory device records only the racing event.

5 Claims, 7 Drawing Sheets

U.S. PATENT DOCUMENTS

| | | |
|---|---|---|
| 4,551,725 | 11/1985 | Schaffer ................................... 342/44 |
| 4,551,801 | 11/1985 | Sokol ...................................... 340/462 |
| 4,593,357 | 6/1986 | Van Ostrand et al. ................. 340/439 |
| 4,701,852 | 10/1987 | Ulveland ............................ 364/424.01 |
| 4,740,905 | 4/1988 | Murakami et al. ..................... 324/166 |
| 4,823,367 | 4/1989 | Kruetzfeld .............................. 340/556 |
| 4,853,856 | 8/1989 | Hanway ............................... 346/33 D |
| 4,873,891 | 10/1989 | Guanciale ................................. 73/117 |
| 4,926,331 | 5/1990 | Windle et al. .......................... 340/438 |
| 4,993,383 | 2/1991 | Wokan et al. .......................... 123/399 |
| 5,047,761 | 9/1991 | Sell ..................................... 340/815.1 |
| 5,051,688 | 9/1991 | Murase et al. .......................... 324/143 |
| 5,099,396 | 3/1992 | Barz et al. .............................. 361/424 |
| 5,173,856 | 12/1992 | Purnell et al. ..................... 364/424.04 |
| 5,309,139 | 5/1994 | Austin ..................................... 340/462 |
| 5,359,284 | 10/1994 | Hawes et al. ........................... 324/146 |

OTHER PUBLICATIONS

Product advertisement, advertising a "two Step" and a "Three Step" module selectors, made by MSD Ignition. The "Two Step" selector is believed to have been publicly known or available at least as early as 1989. The "Three Step" selector is believed to have been publicly known or available at least as early as 1992. Month not available.

Product advertisement, advertising a data logger made by Tach Time. The data logger is believed to have been publicly known or available before Aug. 31, 1994.

Product advertisement, advertising the Star 1000 Onboard Computer, made by Star Race Computers. The Star 1000 is believed to have been publicly known or available before 1992. Month not available.

Product advertisement, advertising the Dedenbear Delay Box, made by Dedenbear Products, Inc. The advertisement appeared in the Dec. 12, 1992, National Dragster magazine, but the product is believed to have been publicly known or available in 1988.

Product advertisement, advertising the Cygnus–1 onboard computer, made by Pro Sport Engineering, Inc. The advertisement appeared in the Dec. 12, 1992 National Dragster Magazine.

Product advertisement, advertising the VC200 Computer, available from Minnetonka Warehouse Supply, Inc. The source and date of the advertisement are unknown, but it is believed that the VC200 was publicly known or available before Aug. 31, 1994.

Product advertisement, advertising "The informer 1+2" digital tachometer, made by Informer Race Products, Inc. The source and date of the advertisement are unknown, but it is believed that "The Informer 1+2" was publicly known or available before Aug. 31, 1994.

Product advertisement, advertising the DS–100 and DS–500 performance computers, available from Race & Performance Monitoring. The source and date of the advertisement are unknown, but it is believed that the DS–100 and DS–500 were publicly known or available before Aug. 31, 1994.

Product advertisement, advertising a split–shift control box, made by Advanced Control Devices. The advertisement is believed to have been printed in the Jan. 28, 1994, issue of National Dragster Magazine.

Product advertisement, advertising the "Race Trakker," a product of A.R.M. Research, Inc. The source and date of the advertisement are unknown, but is believed that the "Race Trakker" was publicly known or available before Aug. 31, 1994.

Product Advertisement, advertising the PM51–3.6 On–Board Computer, a product of Performance Measurement Systems. The source and date of the advertisement are unknown, but it is believed that the PM51–3.6 was publicly known or available before Aug. 31, 1994.

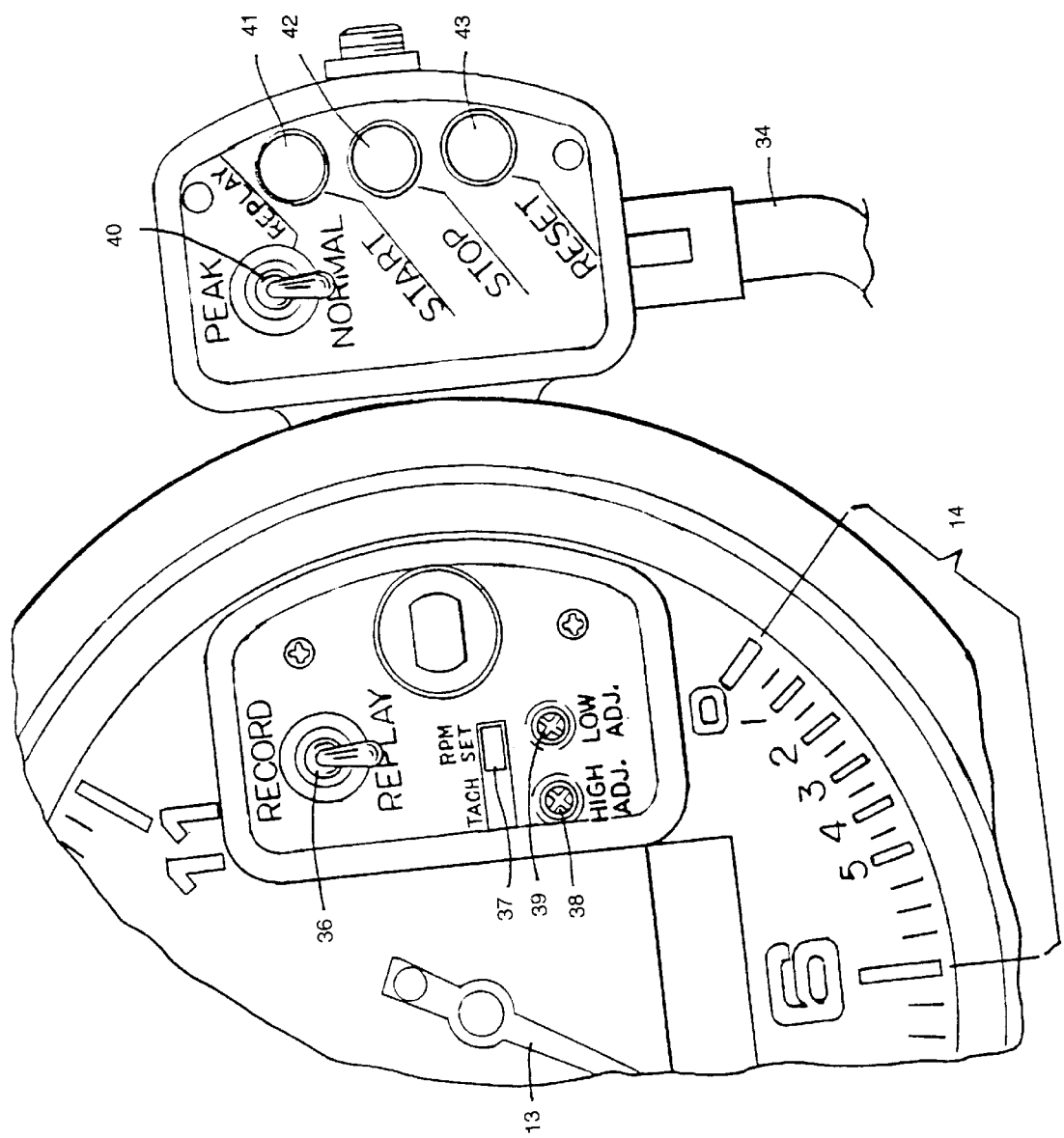

HIGH PERFORMANCE TACHOMETER WITH AUTOMATIC TRIGGERING

CROSS REFERENCES RELATED APPLICATIONS

This application is a continuation of U.S. Ser. No. 08/649,018, filed May 16, 1996, still pending.

BACKGROUND OF THE INVENTION

1. Field of the Art

The present invention relates to tachometers, and more particularly, to high performance automotive tachometers.

2. Discussion of the Related Art

In the world of high-speed autoracing, extreme demands are placed on both car and driver. Nowhere is this more true than in the realm of high-speed, short-duration racing, such as drag racing. In these races, drivers command high performance vehicles to accelerate through one-quarter mile of roadway in approximately seven seconds, reaching speeds of over 200 miles per hour. Frequently, the drivers and vehicles are so competitively matched that as little as one thousandth of one second can make the difference between winning and losing a race. Accordingly, drivers look for any way to improve their performance and consistency, even if only by the smallest of margins.

In this regard, drivers train heavily on effective gear shifting. During a typical, seven second racing interval, the driver must normally shift through four or five gears. Indeed, in the professional drag racing circuit driving skill plays a significant role in the outcome of the race. Not only should the driver be able to shift quickly and cleanly, but the driver should also shift at the appropriate engine speeds to extract the maximum power and racing speed from the vehicle. To be sure, the characteristics of any given vehicle (e.g., engine tune, transmission gearing, tires, body aerodynamics, etc.) combine to define a maximum performance curve for each gear of that vehicle. This performance curve, in turn, defines the optinum engine speed for each gear at which the driver should shift in order to effect maximum speed from the vehicle. In addition to rote practice, however, drivers also lock to instrumentation or other driving aids to help them properly time and execute these critical shifts at the appropriate points along the power curves.

Of course, tachometers have long been known to provide a vehicle operator with an instantaneous display of engine speed. In the area of high performance vehicles, however, tachometers offer special features to provide the extra assistance demanded by the drivers. As an example, some tachometers have a multiple range dial display that expands the critical portion of the dial display. For example, on a circular gauge having a display preprinted near the circumference of the dial face, different scale gradients are provided for different engine speed ranges. Since the lower engine speeds are of lessor significance to the driver for shifting purposes, the scale displaying these lower engine speeds, for example up to 6,000 RPM, is compressed into a small portion of the dial scale display, while the scale displaying higher engine speeds, from 6,000 RPM to 11,000 RPM for example, is expanded to cover the remainder of the dial scale display. In this fashion, the driver can more particularly identify the engine speed in the range surrounding the critical shift points. This type of tachometer can be referred to as a "double range" tachometer.

One known tachometer in the prior art to offer this double range scale utilizes a stepper motor to drive the tachometer pointer or deflection needle. The particular advantage realized by the use of stepper motors is that it is technically easier in a digital circuit to control the deflection needle throughout both the compressed and expanded regions of the dial scale display.

A shortcoming in a stepper motor system, however, resides in the inherent characteristics and limitations of the stepper motor. Since stepper motors are rotated in discrete increments, movement of the tachometer deflection needle is jerky, rather than in smooth, fluid motion. More significantly, the response time of stepper motors is typically too slow for fast revving engines, such as dragster engines. As a result, the engine speed displayed by the tachometer deflection needle lags the actual engine speed. The amount of this "lag" depends upon the rate that the engine speed is changing. This is particularly problematic when the driver targets a specific engine speed at which to shift, since the actual engine speed will be slightly different than the displayed speed.

Other double range tachometers may have the deflection needle controlled by D'arsonval meters. Like stepper motors, however, D'arsonval meters are also characterized by a poor response time that is typically too slow for effective use on dragsters. Furthermore, D'arsonval motors typically have poor vibration resistance, which makes them ill-suited for use on dragsters.

Other engine speed sensing devices are known to provide what can be globally referred to as "RPM switches." These RPM switches are typically individual, stand-alone units adapted to monitor the engine speed and signal or otherwise act upon the detection of certain desired engine speeds. RPM switches are used in a variety of applications such as controlling nitrous oxide injectors, limiting the engine RPM, controlling system ignition timing, and operating shift lights, just to name a few. In a particular vehicle, one RPM switch may be dedicated to control a nitrous oxide injector in such a fashion that the nitrous oxide is controllably injected when the vehicle reaches a preprogrammed engine speed. Similarly, a second RPM switch may be dedicated to controllably advance and retard the ignition timing depending upon the engine speed. A further RPM switch may be dedicated to control a shift light, which illuminates at certain preprogrammed engine speeds to prompt the driver to shift gears. Indeed, shift lights are known to be provided in connection with a RPM switch imbedded within the tachometer.

However, there are various shortcomings in connection with these prior art systems. One shortcoming is the elevated system cost due to number of excess components required by the individual RPM switches. A more significant shortcoming is the compromise of the overall system integrity that results in the various component intolerances, particularly where two or more secarate RPM switches are configured to operate in concert.

While the foregoing tachometer features effectively inform the driver of the proper shift points during "drive time," further assistance is desired. Just as golfer may review a videotape of his golf swing in order to better refine his swing and improve his game, it is known that similar training exercises can help racing drivers improve their driving times.

In this regard, another significant feature found in the prior art is the inclusion of a memory device within a tachometer. These "memory" tachometers are designed to store the engine RPM throughout a racing event, such as a complete drag race, allowing the driver to later review a "replay" of the entire race.

In practice, the engine RPM is sampled at discrete time intervals of sufficiently short duration so that the entire racing event may be accurately recreated for later replay and review by the driver or crewman. From this replay, the driver can identify the particular points at which he shifted, and determine whether he is generally shifting too early or too late. Advantageously, this allows the driver to make adjustments to the timing or technique of his shifting, or engine and suspension set-up etc., that will improve future drive times.

A related feature of these "memory" tachometers is the ability to replay the racing event at a reduced pace, such as one-third the actual recording speed. These tachometers also provide a time counter which displays the elapsed time of the recorded event during memory replay.

While advanced features, such as those described above, allow the driver to observe dynamically the deviations between the targeted or optimum shift points and the actual shift points while the race replay is occurring, further improvements in the art are desired. For example, further improvements are needed that will better enable drivers to more accurately observe the precise RPM and elapsed time at each shift point. Because of the constant movement of the deflection needle and advancing clock display, even when replaying the event at one-third speed the driver still has difficulty in determining the precise RPM and elapsed time at the shifting points.

It is also desired to provide a means for diagnosing possible mechanical or electrical problems within the automobile. It is known, for example, that excessive time required to complete a gear shift may be an indication of clutch slippage. It is also known that if the vehicle requires an excessive amount of time in any particular gear before reaching the targeted shifting RPM, that a particular tuning adjustment may be desired. Accordingly, tachometers are desired that capture and delineate upon replay certain special events that occur during the recorded event.

An additional shortcoming noted in the prior art relates to wasted memory and/or driver distraction, since the driver typically initiates the event recording at some point near tie start of the race. Indeed, if the driver signals the tachometer to begin recording too long before the start of the race, then an excessive amount of memory is filled with engine data that is of no use, and possibly to such an extent that too little memory is left to record a complete racing event. Alternatively, if the driver waits too near to the start of the race before signaling the tachometer to begin recording, then it becomes a distraction to the driver when his attention should be focused on the start of the race.

Another shortcoming of the prior art relates to the inability these systems to create a permanent record of the racing event. In the memory tachometer systems, after the driver has recorded a given racing event, he may review or replay that event, but has no means for readily generating a permanent record of the event. To be sure, in some prior art systems the recorded information is lost when the driver resets the device to record a subsequent racing event.

SUMMARY OF THE INVENTION

Accordingly, it is a primary object of the present invention to provide a high performance engine tachometer capable of recording engine performance over a given time duration and playing back that recording at a later time, and having the added feature of detecting special events that occur during the recording or during memory replay.

Another object of the present invention is to provide a high performance automotive tachometer capable of recording an engine event, such as a drag race, and replaying that recording at a later time, and during the memory replay halting the output of the tachometer and elapsed time clock at times of maximum engine RPMs, such as at each gear shift event.

Another object of the present invention is to provide a high performance automotive tachometer capable of recording an engine event, such as a drag race, and replaying that recording at a later time, and during the replay halting the output of the tachometer at times of minimum engine RPMs, such as at the moment of full clutch engagement following each gear shift event.

Still another object of the present invention is to provide a high performance engine tachometer for recording an engine event, whereby the recording is automatically initiated upon the start of the race.

Another object of the present invention is to provide a high performance tachometer for recording a racing event, whereby the tachometer has an output signal capable of direct connection to a speaker or headset.

Another object of the present invention is to provide a high performance tachometer for recording a racing event and generating a permanent record of that recording.

Still another object of the present invention is to provide a high performance tachometer for recording a racing event, whereby the tachometer has an output signal adapted for connection to a computer, whereby information recorded by the tachometer may be downloaded to the computer where it can be further analyzed or modified.

Another object of the present invention is to provide a high performance tachometer for recording a racing event, whereby the tachometer has an output signal adapted for connection to a printer for generating a tangible record of the recorded event.

Still another object of the present invention is to provide a high performance tachometer having multiple RPM switches that can be programmed to switch various accessories at certain preset engine speeds.

Yet another object of the present invention is to utilize a RPM switch to provide a multi-stage shift light designed to illuminate at different preprogrammed engine speeds to prompt the driver to shift gears.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a high performance tachometer of the type having an input signal indicative of the vehicular engine speed and an output display for displaying the engine speed as indicated by the input signal. The tachometer includes input controls for directing the control and operation of the tachometer; a memory device electrically connected to the input signal, the memory device configured to store the value of the input signal at periodic and discrete time intervals, as directed by the input controls; a special event detector configured to detect a certain predetermined event or pattern of the input signal as determined by monitoring the output of the memory device, the special event detector being further configured to affect the output display upon detection of the predetermined event or pattern of the input signal; and a controller that is electrically connected among the input controls, the memory device, and the special event detector. The controller is designed to control and synchronize the operation among the input controls, the memory device, and the special event detector.

In a preferred embodiment of the present invention, a triggering means is included for providing an automatic start feature for the tachometer memory. Specifically, the triggering means includes a sensor or transducer team is adapted to detect the start of the racing event, and is configured to initiate the recording sequence of the memory device. In one embodiment, the recording sequence is initiated by the driver's normal pre-race preparations. For example, releasing the Line-Loc (front brakes) switch at the start of the race may initiate the recording sequence.

In another embodiment of the present invention, multi-stage RPM switches are provided to centrally control the operation of a plurality of independent devices, such as the nitrous oxide injector, the system ignition timing, and a multi-speed shift light for instructing the driver of the optimum shift points. To be sure, controls are provided to allow at least two engine speed trigger points to be preset in connection with the shift light feature. A separate control signal is provided to instruct the tachometer, and thus the shift light, of the operative preset speed. In a preferred embodiment, this separate control signal is provided by a selector switch configured in connection with the vehicle gear shifter. In this manner, the particular gear that the vehicle is in determines the operative preset engine speed.

BRIEF DESCRIPTION OF THE DRAWINGS

The accompanying drawings incorporated in and forming a part of the specification, illustrate several aspects of the present invention, and together with the description serves to explain the principals of the invention. In the drawings:

FIG. 1B is a cut-away front view of the high performance tachometer of FIG. 1A, more particularly illustrating the user input controls and the compressed portion of the dial scale display;

FIG. 2A is block diagram illustrating several devices that an output signal of several preferred embodiments is configured to connect with;

Reference will now be made in detail to various present preferred embodiments of the invention, examples of which are illustrated in the accompanying drawings.

DETAILED DESCRIPTION OF THE PREFERRED EMBODIMENTS

Figure 1A:
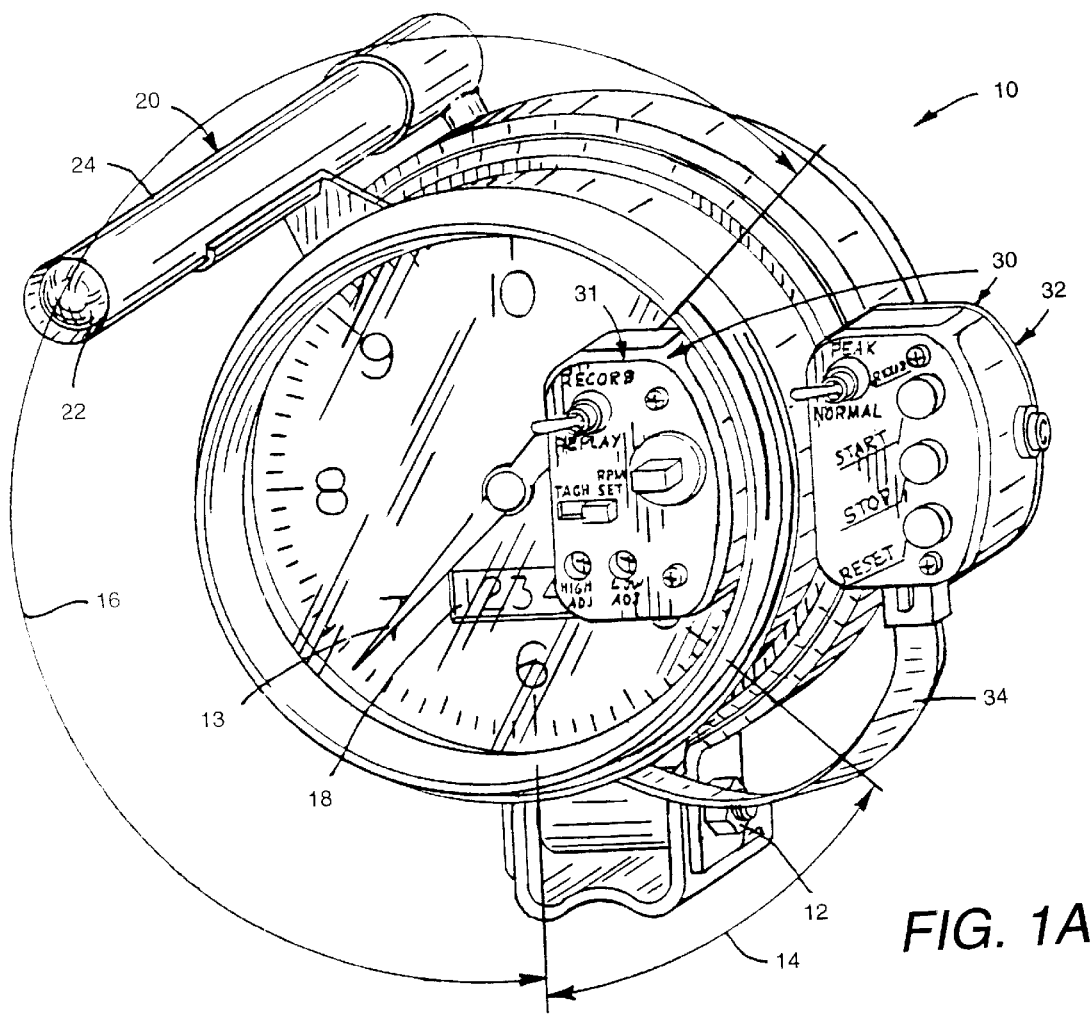
FIG. 1A is perspective view of a high performance tachometer illustrating a preferred embodiment of the present invention.

Reference will now be made to FIGS. 1A and 1B which show a high performance tachometer illustrating a preferred embodiment of the present invention. More particularly, a tachometer 10 having a circular face is provided and generally directed for use in high performance vehicles, especially those adapted for running high speed short duration races, such as drag races. A single bolt mounting bracket 12 facilitates ready installation and adjustability. The circular face includes a pre-printed analog readout having a double range scale 14, 16. A deflection needle 13 is adapted to align with the point along the double range scale that is coincident with the vehicle engine speed.

To more particularly explain the double range scale as shown in the illustrated embodiment of FIGS. 1A and 1B, the scale spans from 0 to 11,000 RMs. The first 6,000 RPMs are compressed into the lowermost portion of the scale and comprise the first "range" 14. The second portion of the scale, or second range 16, is expanded to cover substantially the remainder of the circular face. It should be appreciated that the second range 16 encompasses those engine speeds which are of most concern to the racing driver, since this is the range in which the driver will shift. Accordingly, expanding the scale in this manner facilitates the driver's ability to shift at the appropriate critical shift points. It should be appreciated that, although a double range scale is preferred, the scale could be partitioned into more than two ranges. For example, it may also be desirable to provide an additional expanded scale portion around the typical idle speed.

Also included within the circular face is an digital readout 18. In the preferred embodiment, the digital readout 18 is principally used to display the elapsed racing time. However and as will be discussed in more detail below, in an alternative embodiment the digital readout 18 could be utilized to provide much more information to the driver. For example, the precise engine speed could be digitally displayed on the readout 18. During replay of a recorded event, the readout 18 could also be used to provide information such as shifting time or timing of other critical events, which could help the driver or crewmen diagnose mechanical problems such as clutch slippage or poor engine tune. In this way, the tachometer could be used as a diagnostic tool for the crewmen as well as a training device for the driver.

A side-mounted shift light 20 illuminates to inform the driver of the appropriate times to shift gears. While the preferred embodiment illustrates a shift light 20 as mounted to the side of the dash mounted tachometer 10, it should be appreciated that the shift light could be separated from the tachometer 10 and mounted in any convenient and highly visible location preferred by the driver. In this regard, a wire or some other means of electrical communication between the tachometer 10 and the shift light 20 is all that is necessary.

In the preferred embodiment, the shift light is implemented by an LED 22 recessed within the end of a cylindrical tube 24. Specifically, the receiving end of the tube 24 may be adapted with a concave reflective mounting surface (not shown) which is adapted to received the recessed LED 22. This configuration would serve to collimate the beam so that the relatively low powered LED 22 creates a highly visible beam for the driver.

Also shown in FIG. 1A, and more particularly shown in FIG. 1B, are the various driver controls 30. In the illustrated embodiment, the controls are segmented into two modules 31 and 32. The first or local module 31 is attached to the face of the tachometer 10. The second or remote module 32 is shown as attached to the outer rim of the tachometer 10, but is detachable, whereby it can be placed in any convenient location for the driver's use. To facilitate the detachment, a cable 34 is provided that electrically connects the remote module 32 to the tachometer 10. It should be appreciated, however, that other means for electrically connecting the remote module 32 to the tachometer 10 could also be employed. For example, the remote module 32 could be a free-standing device in communication with the tachometer 10 through radio frequency, infra-red, or other length electromagnetic waves. In yet another embodiment, the two control modules 31 and 32 could be consolidated into a single, detachable module as described in connection with the remote module 32.

Before discussing the features and user-controlled operations of the preferred embodiment, a brief description of the controls is in order. On the first module 31, a two position toggle switch 36 is provided to allow the driver to select between record and replay modes. A two position slide switch 37 having positions labeled "TACH" and "RPM SET" allows the driver to set high and low engine RPM in connection with the two-stage shift light 20 previously described. Two potentiometers, one labeled "HIGH ADJ." 38 and the other labeled "LOW ADJ." 39 are used to set a particular RPM for the high and low engine speeds that are used to trigger the shift light 20. The adjustment screw for each of these potentiometers is adapted for rotation by a screwdriver, and is recessed below the face of the control module 31. In this way, the engine speeds can be set by the driver or a crew member well before the race to be recorded, without risk of the setting being upset by inadvertent contact made with the control panel.

The remote control module 32 has a two position toggle switch 40 labeled "REPLAY" and allows the driver to select between "PEAK" or "NORMAL" replay modes. As will be discussed further below and in connection with the particular features provided by the preferred embodiment, when "PEAK" replay is selected the deflection needle 13 of the tachometer 10 and the digital readout 18 will freeze when peak RPM readings are detected (typically at each shift point). In contrast, when in the normal replay mode, the entire racing event will be replayed at one-half speed, without pause at the various peak RPM readings. Three normally open push button switches are also provided on the second module 32. The switch 41 labeled "START" can be depressed by the driver to initiate the start of the recording event (in the rare case that he does not want to utilize the automatic recording star feature) or memory replay, depending upon whether switch 36 (discussed below) is in the "RECORD" or "REPLAY" position. The second switch 42 labeled "STOP" is depressed to stop both the recording event and the memory replay, depending on the position of switch 36. Finally, the third switch 43 labeled "RESET" is used to reset the tachometer memory back to the beginning of memory.

Discussion will now be more particularly directed to the features of a preferred embodiment of the present invention, and how the user controls 30 described immediately above are used to effectuate these features. As previously mentioned, the record/replay switch 36 is used in conjunction with the second or remote module 32 to control record and replay functions. Placing the switch 36 in the RECORD position configures the tachometer for recording a racing event, while placing the switch in the REPLAY position prepares the tachometer for replaying a previously recorded event. The remainder of the controls on the local module 31 are directed to setting the parameters for operation of the shift light 20.

The shift light 20 of the preferred embodiment is a two-stage shift light that illuminates to instruct the driver to shift at two separate and distinguished engine speeds. A command signal 35 (See FIG.3) is used to instruct the tachometer 10 and ultimately the shift light 20, whether to illuminate at the low or high engine speed setting. In one embodiment, this input signal 35 may be generated by a selector switch 29 that the driver could actuate during the race so that, for example, when the switch is in one position the shift light 20 would illuminate at the low engine speed setting, and when the switch is in the other position the shift light 20 would illuminate at the high engine speed setting. In this way, if the driver desired the shift light 20 to illuminate at the high RPM setting gears 1 and 2 and a the low RPM setting for the remainder of the gears, he would simply flip the switch after executing the second shift.

Alternatively, and as is preferred, the low speed setting is utilized for first gear only, and the remaining gears utilize the high speed setting. In this embodiment, the selector switch 29 may be mounted in cooperation with the gearshift lever so that when in fist gear the switch remains closed and the low speed setting for the shift light is activated. Once the driver has shifted out of first gear, the switch is open and the high speed setting for the shift light 20 is in effect for the duration of the race. In this way, the driver need not be concerned with releasing or flipping a switch during the racing event, but instead can concentrate more fully on the race. It should be appreciated that, if desired, additional switches for additional engine speed settings could be included, allowing three or even more distinct engine speeds to be set for triggering various external engine and vehicle control systems.

To set the high engine trigger speed for the shift light 20, a two position slide switch 37 and two potentiometers 38 and 39 are used in conjunction. Specifically, the two position slide switch 37 is used to select between the "RPM SET" mode and normal tachometer operation ("TACH"). To set the high speed setting, the slide switch is placed in the "RPM SET" position, the gear shifter is taken out of first gear, and the adjustment screw for the high speed potentiometer 38 is rotated to set the needle to the desired engine speed. In the preferred embodiment, and as will be described in more detail in connection with FIG. 3, as the adjustment screw of the adjustment potentiometers 38 and 39 are rotated, the deflection needle 13 of the tachometer 10 moves to reflect the trigger speed by pointing to appropriate value on the preprinted analog readout. In this way, the driver can see precisely the engine speed that is being set.

In a similar fashion, the low engine trigger speed is set by placing the slide switch 37 in the "RPM SET" position, with the gear shifter placed in first gear. A momentary switch electrically connected to the tachometer 10 and mounted in connection with the gear shifter detects whether the shifter is in first gear. As with the high speed adjustment described above, potentiometer 39 is rotated to set the low engine trigger speed.

In order for a driver to configure the controls 30 to record a racing event, the two position switch 36 is placed in the RECORD position and the RESET switch 43 is depressed. The RESET switch instructs the tachometer to go to the beginning of its internal memory and prepare to record a first racing event. The automatic memory start feature and STOP switch 42 then control the recording for particular racing events. More particularly, the tachometer memory of a preferred embodiment, has approximately 40 seconds of recording capability. Therefore, sufficient memory is provided to record several complete racing events. Accordingly, multiple racing events may be recorded by depressing the STOP switch 42 immediately following each recorded race, but without again depressing the reset button after each race is recorded. The later races are then stored sequentially in memory following the previously recorded race.

After one or more racing events have been recorded and stored in the internal memory, the driver may review these races by placing the toggle switch 36 in the REPLAY position and depressing the RESET switch 43, which instructs the system to go back to the beginning of memory. Using the START and STOP switches 41 and 42 the driver may control the replay, stopping it at particular points of desire. Also, the memory replay will automatically stop at the end of each recorded race. Depressing the START switch 41 will initiate replay of the next recorded event.

In connection with the memory replay feature, the driver can use toggle switch 40 to select whether he wishes to view the replay in the PEAK or NORMAL modes. In the NORMAL replay mode, the race is replayed at one-half its original or recorded speed. However, in an alternate embodiment an additional user control, such as a potentiometer, can be provided to allow the user to adjust the replay speed. In contrast to the NORMAL replay mode, when the race is replayed in PEAK mode, both the deflection needle 13 and the digital readout 18 halt or freeze at high and low peak positions. That is, points in which the tachometer needle changes direction. Once the needle halts, the driver can resume the replay of the racing event by depressing the START switch 41 once again.

If more than one racing event was recorded within the memory, replay will automatically stop at the end of each race. Replay of the second event can then be initiated by pressing the START switch 41. The racing events can be replayed a number of times simply by depressing the reset button 43, which returns the replay back to the start of the first recorded racing event, which the can be replayed by pressing the START switch 41. As previously discussed, the digital readout 18 provided on the face of the tachometer 10 functions in connection with the replay features described above. In the preferred embodiment, the digital readout 18 displays a counter of the elapsed time within the racing event.

Figure 2A:
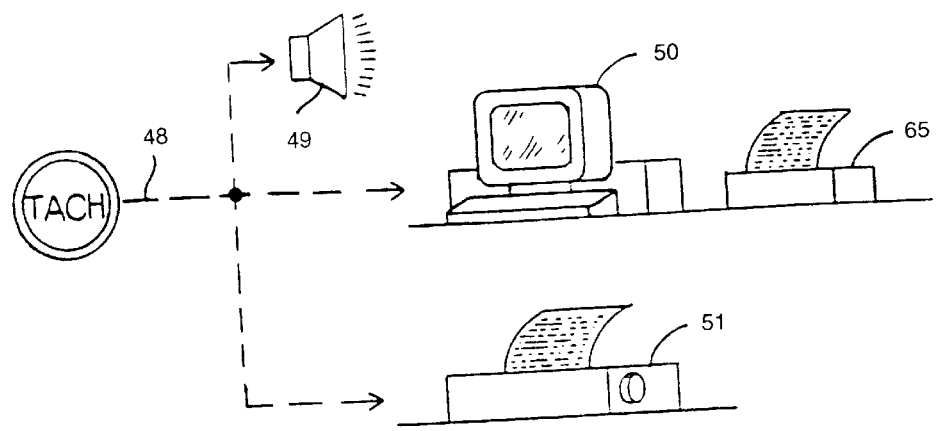

Reference is now made to FIG. 2A, illustrating various features of the present invention in connection with an output signal. Specifically, an output signal 48 is generated and can be connected to a speaker or a speaker or headset 49, a computer 50, or a printer 51. In the preferred embodiment, the output signal can be directly connected to a speaker or headset 49. In this embodiment, the signal on the output line oscillates at the same frequency as the instantaneous engine speed as it is output from the memory device (see FIG. 3) within the tachometer 10. Advantageously, this allows the driver to listen to the replay of the recorded race, as well as reviewing it visually. To the skilled driver or crewman, certain subtleties may be detected audibly that may not be readily apparent from the visual display. For example, hearing sudden spikes in engine speed coincident with shifting could be an indication of clutch slippage.

The output signal 48 of the preferred embodiment may also be connected to a specialized printer 51. This printer is termed as "specialized" in that it has internal hardware and software specifically designed to receive the memory output signal described above and generate a chart as illustrated in FIG. 2B to create a permanent and tangible record of the racing event. Specifically referring now to FIG. 2B, the chart generated by the printer 51 of the preferred embodiment includes a graphical display in which the engine RPM is plotted against time. As shown from the graph, the high and low engine speed adjustments for the shift light 20 also can be plotted on the graph so that the driver can determine from a quick visible glance whether, in general, he is shifting too early or too late. Moreover, a log of such printouts may be compiled and maintained over a period of time allowing the driver to study his shifting and/or racing habits to see where improvements can be made.

Figure 2B:
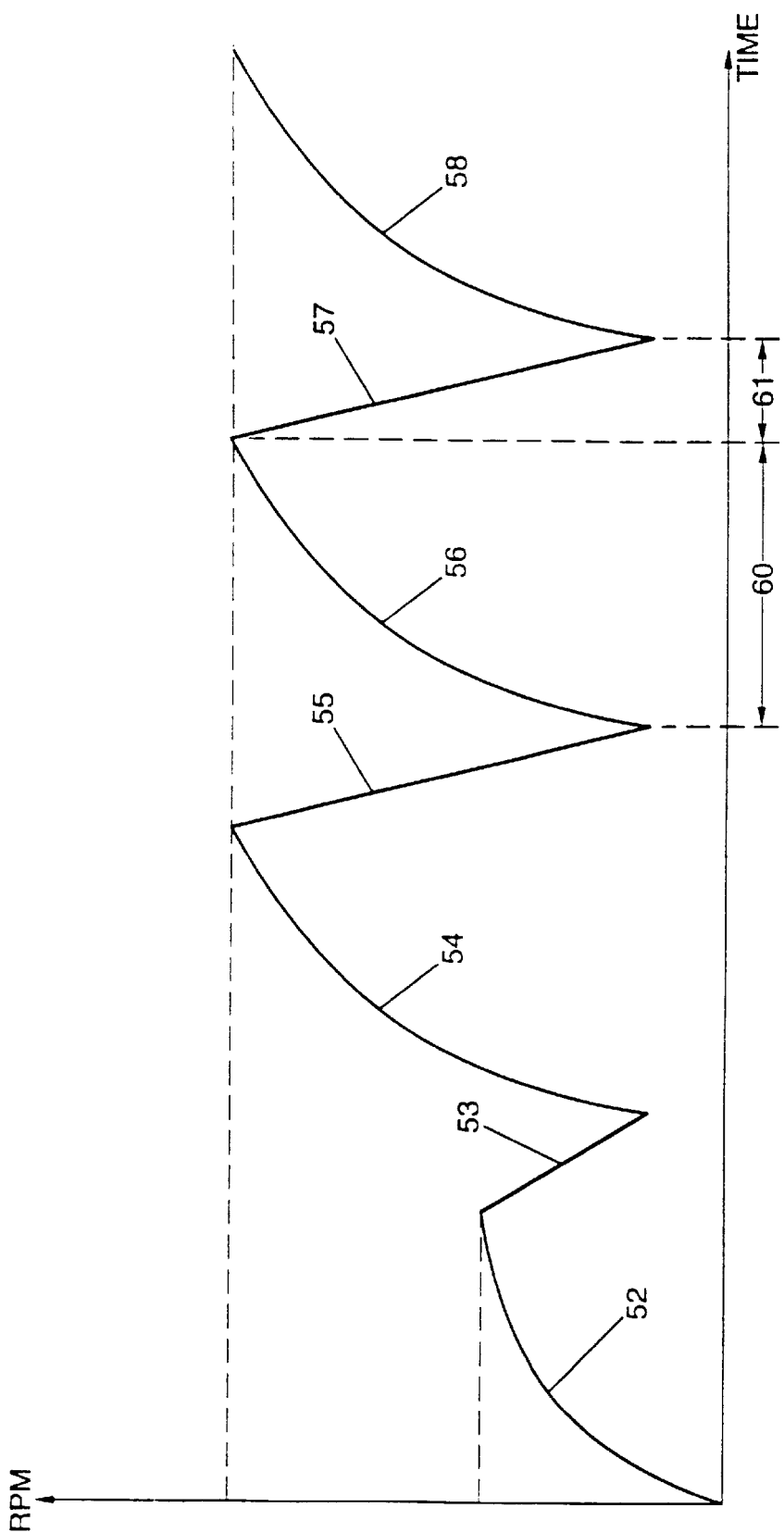
FIG. 2B is an illustration of a graphical chart plotting RPM versus time, as prepared by a printer connected to an output signal of a preferred embodiment as shown in FIG. 2A.

The information in the graph also conveys important information to the crewmen. For example, and more specifically, the chart in FIG. 2B shows a plot of the engine speed in RPM versus time during a racing event in which the vehicle was shifted through four gears. The engine speed for the duration during first gear is represented by reference numeral 52. Similarly, reference numeral 53 represents the duration of the shift and clutch engagement from first to second gear. Reference numerals 54, 56, and 53 illustrate the engine speed throughout the durations of second, third and fourth gears, while reference numerals 55 and 57 represent the engine speed during the shifts from second gear to third and from third gear to fourth, respectively. If, for example, a crewman were to note that the time 56 required by the vehicle in third gear to reach the appropriate shift speed was excessive, tune-up work may need to be made. Similarly, excessive time required for clutch engagement between gears may indicate that clutch linkages, or clutch disc and pressure plate, are faulty or out of adjustment. Accordingly, the printed graphical display of the replay of the racing event can provide extremely useful, and perhaps critical, information to both driver and crewman.

Referring again to FIG. 2A, in an alternative embodiment the output signal 48 may be directly connected to a computer 50. In this regard, the necessary hardware and/or software is included within the tachometer 10 to format the output signal for connection to a computer 50 through either a standard parallel or serial link. In this way, the information may be downloaded to the computer 50 where it may be permanently stored on diskette. Of course, once the data is on the computer 50, it may be more easily manipulated or displayed using either specialized or even conventional software. Furthermore, permanent and tangible graphical displays may be printed on a standard printer 65 connected to the computer 50. In yet another embodiment, the tachometer 10 may be directly connected to the standard printer 65. In this embodiment, the necessary hardware and software is included within the tachometer 10 to format the output signal 43 for direct connection to such a standard printer.

Figure 3A:
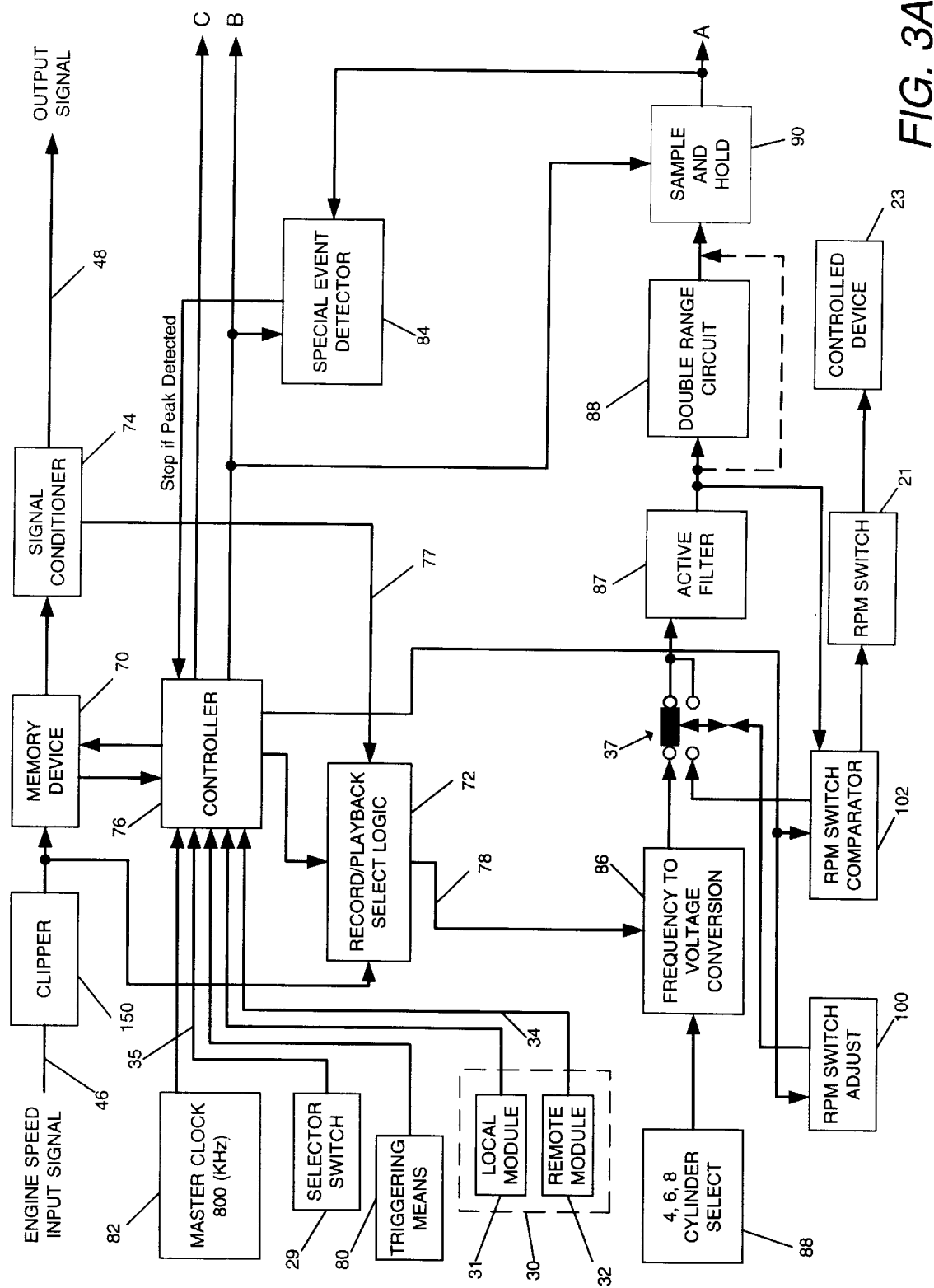
FIGS. 3A and 3B collectively are a block diagram showing the functional components of a preferred embodiment of the present invention.
Figure 3B:
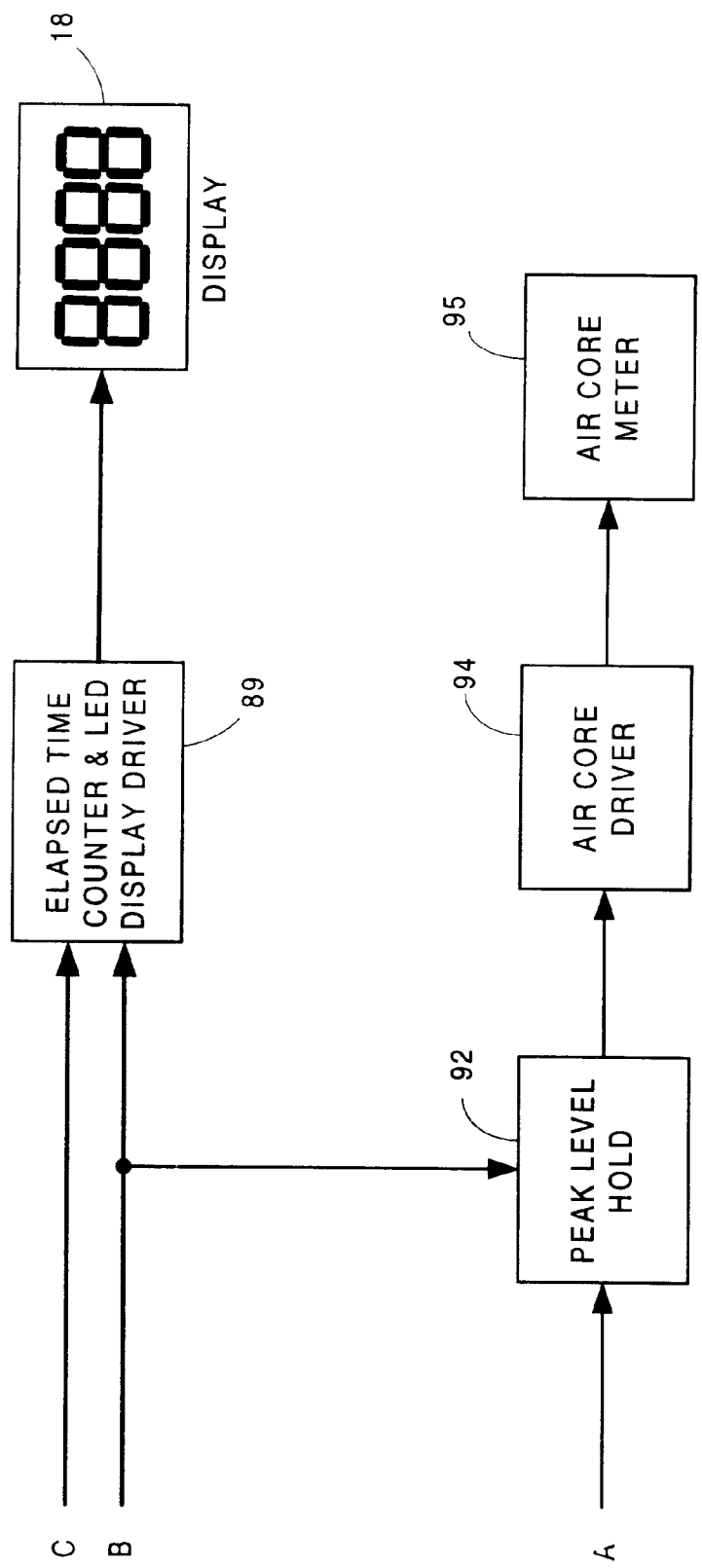

Reference will now be made to FIGS. 3A, and 3B in describing the operation of the present invention. Specifically, FIGS. 3A and 3B illustrates a functional block diagram of the present invention as implement through discrete components, including a specialized analog memory device. Before proceeding to the discussion in reference to FIGS. 3A and 3B, however, it is important to point out that the functional blocks shown in the figures are intended to be illustrative of particular features of the present invention and are in no way intended to limit the scope of the claimed invention.

Turning now to the figure, an engine speed input signal 46 is input to a memory device 70 and also to a record/replay select logic functional block 72. Although not shown in the figure, it is known in the art that the input signal 46 is derived from the low tension side of the ignition coil, for standard ignition engines, and from a tachometer terminal provided on electronic ignition cars, or other triggering devices such as optical encoders, inductive pickups, etc. Of significance, is that the frequency of the input signal 46 is proportional to the frequency of the vehicle engine speed (the proportionality factor being determined by the number of engine cylinders.) The memory device 70 of the preferred embodiment, is an analog memory. Specifically, the memory device is the ISD1016, manufactured by Information Storage Devices, Inc. and is commonly used in the storage and reproduction of analog speech signals in a digital fashion. Although a detailed understanding of the device can be obtained from the manufacturers data sheets, such a description is not presented herein as it is not deemed necessary for an understanding of the present invention. Moreover, the application of the ISD1016 in the present invention is uniquely outside the scope of the manufacturer's intended use. Indeed, it should be appreciated that other storage devices, including digital memories, could be used with equal success. Of course, since the input signal 46 is an analog signal, if a digital memory were selected, the appropriate filtering, sampling and digitizing support circuitry would need to be included.

The output of the memory device 70 is directed to a signal conditioner 74. In the preferred embodiment, the signal conditioner 74 is principally an amplifier circuit for generating the appropriate signal level on the output signal 48 for directly driving the speaker or headset 49 as described in connection with FIG. 2. A second output of the signal conditioner 74, is directed to the functional block 72 labeled as record/replay select logic. As previously mentioned, the engine speed input signal 46 is also directed to this functional block, the output of which is determined by the position of the record/replay toggle switch 36. The state of this switch 36 is directed to a central controller 76 which generates a signal that instructs the functional block 72 to direct either the input signal 46 or the signal 77 generated by the signal conditioner 74 to its output 78. If the switch 36 is in the RECORD position, then the input signal 46 is directed to the output 78. If the switch 36 is in the REPLAY position, then the signal 77 is directed to the output 78.

In the preferred embodiment, the central controller 76 includes all the necessary and appropriate circuit blocks to implement the proper control and synchronization required by the system components. Both the local and remote modules 31 and 32 of the control inputs 30 are input to the controller 76. A triggering means 80, master clock 82, and special event detector 84, which will be described in more detail below, also generate inputs to the controller 76.

In keeping with the description of a preferred embodiment, the output 78 of the functional block 72 is input into a frequency to voltage converter circuit 86. The operation of the frequency to voltage converter 86 is dependent upon a cylinder select input 88. Specifically, an internal control setting, that is to be set upon installation of the tachometer 10, informs the frequency to voltage converter as to whether the vehicle is a four, six, or eight cylinder engine. The frequency of the signal input to the converter 86 is scaled by the four, six, or eight cylinder select switches. The resulting frequency value reflects the frequency value.

The scaled voltage value output from the frequency to voltage converter 86 is passed through a filter circuit 87 and double range circuit 88. Of course, the double range circuit 88 is included only in those tachometer models having a double range scale as described previously. More particularly, the double range circuit 88 makes the appropriate compensations to both the low level and high level voltage values output from the frequency to voltage converter 86 to effect the desired displacement of the tachometer deflection needle 13 in the appropriate display ranges 14, 16 (See FIGS. 1A and 1B). For example, an input voltage corresponding to an RPM of 6000 or less is compensated in such a fashion to move the deflection needle 13 only a small distance. Input voltage values corresponding to engine RPMs greater than 6000, compensation are compensated in a manner to effect larger needle 13 deflections.

The output of the double range circuit 88, which is a continuous signal, is input to a sample and hold circuit 90 which, as the name implies, samples and outputs periodic samples of the continuous time signal input from the double range circuit 88. The output from the sample and hole 90 is then passed through a peak level hold circuit 92 and an air core driver 94, which drives an air core meter 95 (described below). The peak level hold circuit 92 operates only to hold the output a level value when a maximum, minimum, or other special event has been detected. Freezing or halting the output signal in this manner causes the deflection needle 13 to hold steady in its current position. It can be appreciated, that the driver 94 and air core meter 95 are elements that are known in the art and, accordingly, a detailed description of their operation is not necessary here.

Also illustrated in the figure are the digital readout display 18 and its associated driver circuit 89. The input for the digital display 18 is generated by the controller 76, which in the preferred embodiment, causes the digital readout 18 to display a counter showing the elapsed time of the racing event.

Figure 4A:
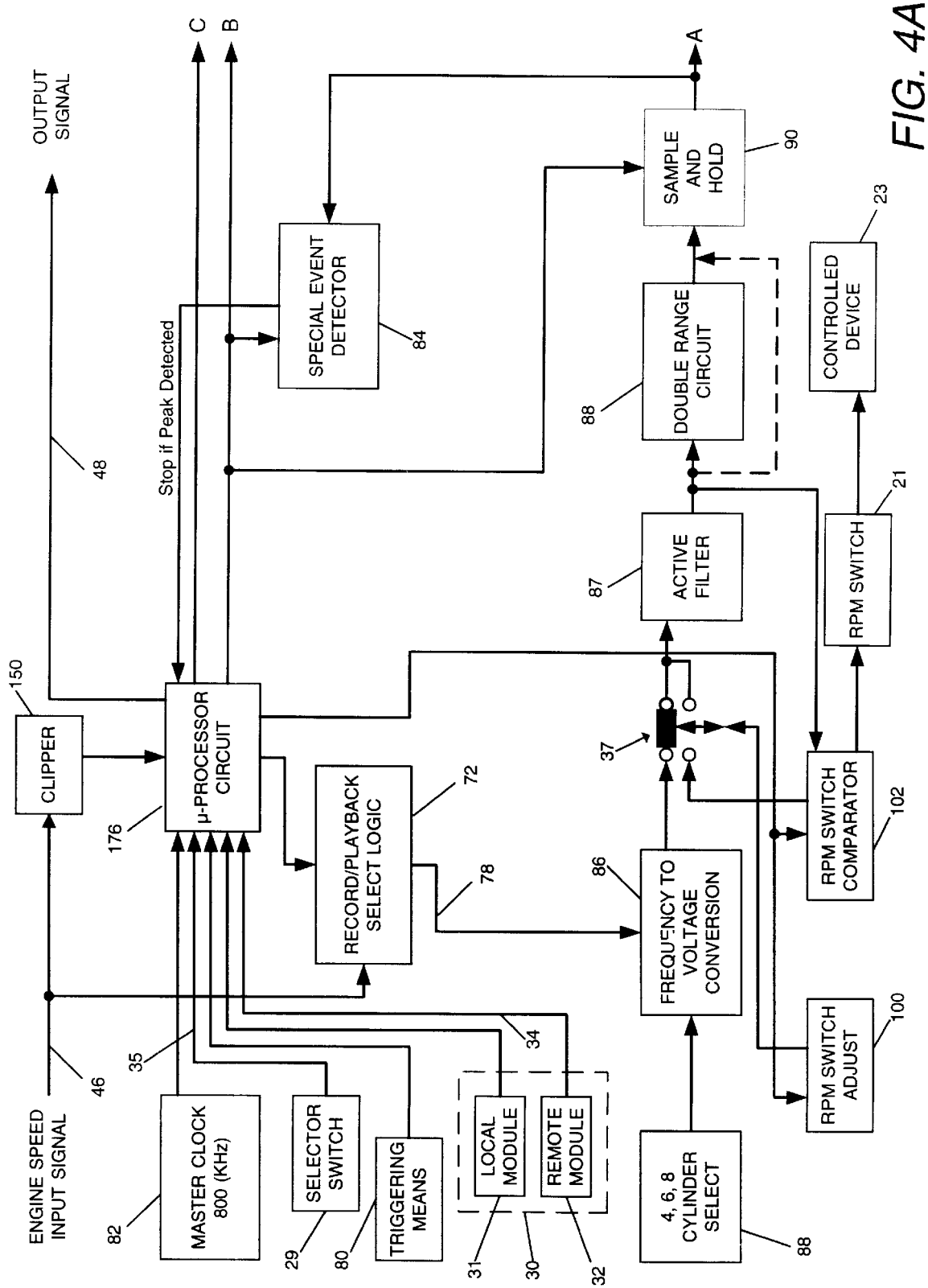
FIGS. 4A and 4B collectively are a block diagram showing the functional components of an alternative embodiment of the present invention.
Figure 4B:
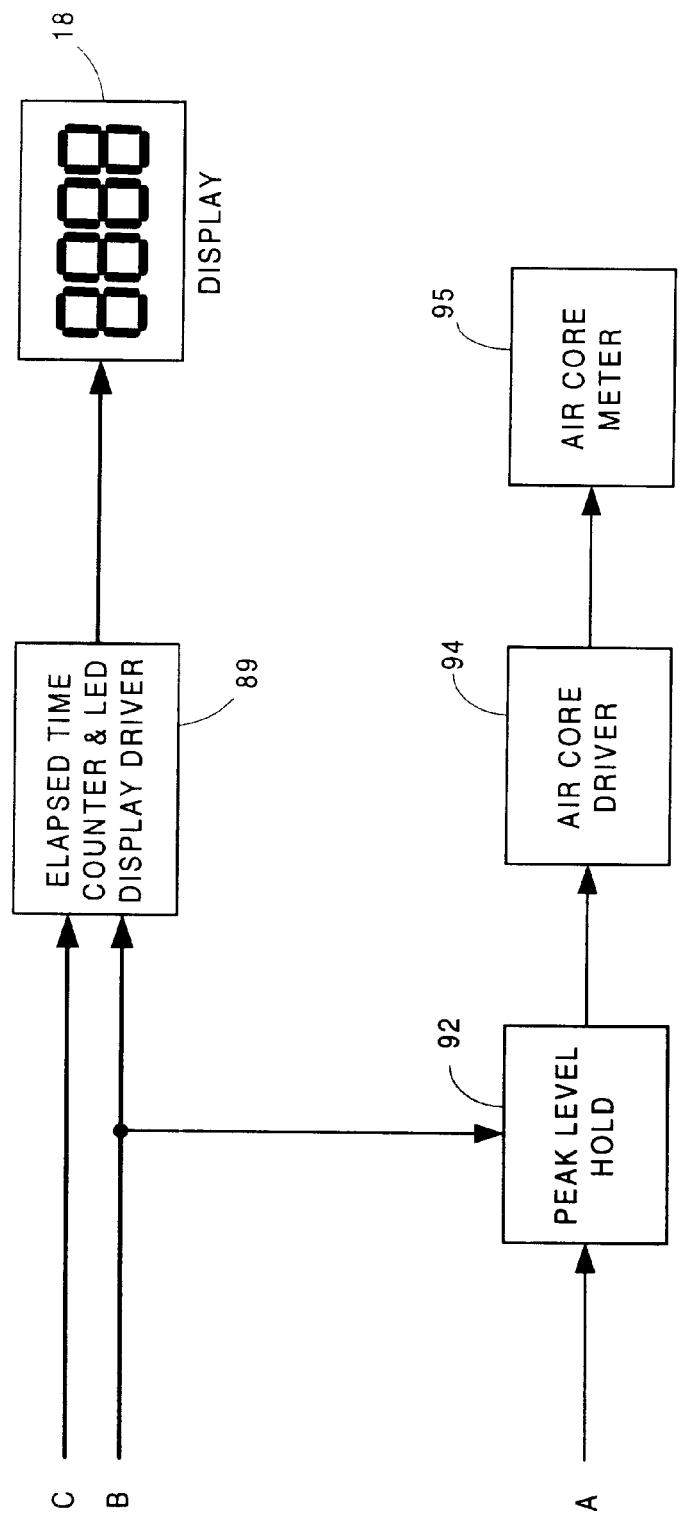

Further description of FIGS. 3A and 3B will be provided below, in reference to special features of the present invention. Before describing these special features, however, brief reference will be directed to FIGS. 4A and 4B which illustrate a functional block diagram of an alternate embodiment of the present invention as implemented with a microprocessor based circuit and appropriate software routines. Due to the similarity between FIGS. 3 and 4, reference to this specific reference to FIGS. 4A and 4B is made only to point out the differences between FIGS. 3 and 4.

Specifically, FIG. 4 is designed around a microcontroller or microprocessor based circuit 176, which includes all the appropriate support circuitry (e.g., ROM, RAM, decoders, etc.) required to effectuate the operation as described herein. A clipper circuit 150 is provided to condition the input signal 46, whereby the analog pulses of the input signal 46 are effectively converted into digital pulses. The signal conditioner 74 of FIG. 3A is removed, as the output signal 48 is driven directly by the microcontroller or microprocessor circuit 176.

Other than these primary differences, the two embodiments operate functionally in a very similar manner. It should be appreciated that a person of ordinary skill in the relevant art could design the specific hardware, whether it be using discrete components in accordance with FIGS. 3A and 3B, or microprocessor based in accordance with FIGS. 4A and 4B. Accordingly, a detailed component level description is not deemed necessary.

In view of the system as set out in the foregoing description, the discussion is now directed to more particularly illustrate several significant features of the present invention.

Special Event Detection

In accordance with the concepts and teachings of the present invention, a special event detector is provided and configured to detect certain predetermined special events, such as peaks, valleys, or any other predetermined event in the signal recorded and output (during replay) from the memory.

To implement this feature in a preferred embodiment, a special event detector circuit 84 monitors the output of the sample and hold circuit 90 to detect such predetermined special events. In the preferred embodiment, the special event detector is adapted to recognize both peak and valley transitions in the output signal, which are indicative of vehicle gear changes. This information can be used, in ways previously described, to provide valuable insight to both driver and crewmen for reviewing racing performance.

As noted in the figure, the special event detector 84, the sample and hold circuit 90, and the peak level hold circuit 92 are all disabled when the record/replay toggle switch 36 is in the RECORD position, and thus the tachometer 10 is in the RECORD mode. Accordingly, the deflection needle 13 of the air core meter 95 is fluidly driven during the recorded racing event, and is only effected by the operation of these specialized circuits during the replay of the recording. During replay, however, the special event detector 84 and the peak level hold circuit 90 can be configured to halt or freeze the deflection needle 13 of the air core meter 95 upon detecting a special event. The digital readout 18, which displays the elapsed racing time, is frozen as well. Replay is continued by depressing the START switch 41 (FIG. 1).

In an alternative embodiment, the sample and hold circuit 90 and special event detector 84 can be configured to monitor the input signal 46 to detect predetermined special events. These special events could then be "marked" in memory as the input signal is recorded. On replay, the "marked" memory locations would signal the peak level hold circuit 90 to halt or freeze the output display.

Automatic Memory Start

Another significant feature provided in connection with the present invention is an automatic memory start feature. This feature enables the tachometer 10 to automatically sense the start of the racing event and begin recording engine speed information therewith. It can be appreciated that this feature provides at least two distinct advantages over systems in the prior art. First, it reduces the driver distraction, previously described, near the start of the race, by allowing the driver to focus on the racing event rather than starting the recording process on the tachometer 10. Secondly, it reduces the amount of memory required for the racing event, thereby allowing more events to be recorded in the system memory space.

More particularly, a triggering means 80 is provided to sense the start of the racing event. In the preferred embodiment the triggering means includes an electrical signal driven by the Line-Loc or Transbrake (i.e., front brakes) switch. This switch is used to actuate the front wheel brakes when the vehicle is positioned at the starting line prior to the race. Once the driver has positioned the vehicle at the starting line and actuates the Line-Loc, the tachometer 10 is automatically put into a "ready" state. Then, when the driver releases the Line-Loc, the tachometer recording sequence automatically begins.

It can be appreciated that the triggering means 80 may comprise other equally effective sensors or transducers for detecting the start of the race. For example, in an alternative embodiment a sensor may be configured to detect wheel rotation, whereby detecting wheel rotation initiates the recording sequence. In yet another embodiment an accelerometer may be used to detect the start of the racing event. In still another embodiment, motion sensors, configured to detect movement of the vehicle over the ground, may be implement as the triggering means. In yet a further embodiment, a light sensor may be adapted to detect the light beam that is projected across the race track and used to start the race timing computer. These and other means consistent with the teachings provided herein may be utilized to implement the triggering means that initiates the recording sequence.

In another embodiment of the present invention, a temporary buffer memory is used in connection with the automatic start feature. In this embodiment, pre-race RPM data is stored in the buffer memory. Once the race is started, as indicated by the triggering means, the contents (or at least a portion of the contents) from the buffer memory are stored into the event recording memory. In this way, RPM data immediately preceding the start of the race is recorded in the memory for later replay. The amount of "pre-race" RPM data ultimately stored in the recording memory may be varied depending upon the design and configuration of the buffer memory. In effect, the buffer memory creates a sliding window during which pre-race RPM data is dynamically stored, whereby upon the start of the race, as indicated by the triggering means, the RPM data stored in the memory buffer or sliding window is written into the recording memory.

In another alternative embodiment, controls may be provided to allow the driver to override the automatic start feature, whereby the recording sequence is initiated manually by pressing the START switch 41.

Multi-stage RPM switch

Another feature provided in connection with the present invention is the inclusion of a multi-stage, centralized RPM switch. As previously described, independent and dedicated RPM switches are known for controlling the operation of devices such as a nitrous oxide injector, a shift light, an RPM limiter, and the ignition system timing. The RPM switch of the present invention, however, is adapted to provide a centralized control for all such devices throughout the vehicle.

Specifically, a RPM switch 21 is provided in connection with a RPM switch adjust 100 and a RPM switch comparator 102 functional blocks. The RPM switch adjust routine 100 provides an input to the RPM switch comparator indicative of the engine speed at which the shift point is to be set. Slide switch 37 is shown interconnected among the frequency to voltage converter 36, the filter block 87, and the RPM switch comparator 102. When in its upper or "TACH" position, continuity is established between the converter 86 and filter 87. However, when the slide switch is moved to its lower or "RPM SET" position, coincident with high speed or low speed engine shift point settings, a continuous circuit path is created between the RPM switch comparator 102 and filter 87. In this way the shift point, as output from the RPM switch adjust block 100 (ultimately derived from potentiometers 38 and 39, and the momentary switch mounted in connection with the gear shifter, as described in connection with FIG. 1) is routed through the active filter 87 and other circuit components previously described so as to drive the deflection needle 13 of the air core meter 95 to display the particular engine speed set point being adjusted. It can be appreciated from the figure, that when the switch 37 is in its upper or "TACH" position, that the RPM switch circuitry does not effect the operation of the remaining circuit elements.

When, however, the switch 37 is in its normally operative "TACH" position, the RPM switch comparator 102 compares the output of the RPM switch adjust 100 with the output from the filter 87. If the output from the filter 87 is greater than or equal to the RPM switch adjust value, then the output of the shift point comparator 102 turns on so as to activate the RPM switch 21, which, in turn, is configured to operate a controlled device 23. In the preferred embodiment, the controlled device 23 is a shift light 20 (FIG. 1), and the RPM switch adjust is adapted to program the shift light 20 to illuminate at two distinct engine speeds, depending upon the gear the vehicle is presently in.

It should be appreciated that the output of the RPM switch adjust block 100 is controlled by controller 76 or microcontroller or microprocessor circuit 176. Accordingly and based on the inputs, including controls 30 and selector switch 29, the controller 76 or microcontroller or microprocessor circuit 176 can be designed so that a plurality of RPM switches each having multiple set points that can be programmed into the tachometer. In a similar fashion, a plurality of independently programmed and operated controlled devices 23 can be controlled and operated by the tachometer of the present invention. These controlled devices may also include a nitrous oxide injector, an RPM limiter, system timing control, and any other device similarly operated in connection with the vehicle engine speed.

A significant advantage of the centralized RPM switch control of the present invention is that the engine trigger speed for each of the controlled devices 23 is set or programmed through the same driver circuitry to the air core meter 95 as the engine speed input signal 46 is ultimately passed through. Accordingly, system integrity is achieved without the problems typically encountered by component intolerances among several independent and dedicated controlled devices.

Memory Pages, Partitions, and Usage

Other significant features of the present invention relates to memory allocation and usage. Specifically, features are provided which employ dynamic memory allocation so as to maximize the event storage capability of the present invention.

In the embodiment illustrated in connection with FIGS. 3A and 3B which utilizes an analog memory device 70, one page of memory is provided, and is configured so as to record 40 seconds of engine speed data. In this embodiment, multiple racing events are sequentially stored in this single memory page. Depressing the STOP switch after each recorded event causes an event marker to be placed in memory so as to delineate to successively stored racing events. In this manner, successive racing events may be sequentially stored in memory so as to achieve complete utilization of the available memory space.

In the embodiment illustrated in connection with FIGS. 4A and 4B, the available digital memory space is partitioned into a number of pages (four pages in a preferred embodiment). Each page is independently configured to store a number of successive racing events in the same manner as described above for the embodiment employed in connection with FIGS. 3A and 3B. The four memory pages allow easier access to multiple race recordings with less chance of data loss when making additional race recordings. Consistent with these teachings, additional memory components could be added to provide even greater storage capabilities.

An additional feature provided in connection with the memory allocation is what can be referred to as a memory extension feature. In essence, this feature is a means of data compression which allows even more racing information to be stored within the system memory space. Specifically, the input signal is sampled and converted into a two part number, having a mantissa and an exponent. If, at the time of the next signal sample, the value of the exponent portion has not changed from the previously stored exponent value, then only the mantissa portion is stored. With the relatively fast sampling rates of the present invention, frequently a single exponent value will be stored for many mantissa values, and thus requiring much less memory.

Given the memory costs and tachometer space constraints, it can be appreciated that the features described above effectively allocate and utilize the available memory space so as to maximize the system memory usage.

Multiple Range Dial

Another significant feature c the present invention relates to the multiple range display. In the preferred embodiment the display is a double range display, which compresses the first 6,000 RPM and expands the remaining 5,000 RPM (i.e., 6,000–11,000 RPM). As previously described, double range displays are known which are controlled by stepper motors. However, these systems are ill-suited for high revving drag racing engines due to their poor response times. Indeed, most racing instruments utilize what is known as an air core meter 95 which is controlled by a specialized (but well known) driver chip 94 (the driver chip is a CS289). The air core meter 95 provides extremely fast response times and fluid movement of the deflection needle 13. As is known in the art, the air core meter 95, magnetically drives the deflection needle in an X-Y coordinate, dual torque action.

It is an advanced feature of the present invention to drive the air core meter 95 throughout the full range of deflection, including both the compressed and expanded scales, while also controllably providing smooth, controlled movement of the deflection needle at the transition point dividing the compressed and expanded scales. This feature is provided in the double range circuit 88.

In one embodiment, the double range circuit 88 is implemented by analog circuit components designed to controllably weight the signal output from the filter 87, so as to effect the appropriate movement or deflection of the deflection needle 13 of the air core meter 95. Alternatively, the air core meter 95 may be directly driven by the controller 76 or microcontroller or microprocessor circuit 176 in a pulse width modulation fashion. In such an embodiment, the controller 76 or microcontroller or microprocessor circuit 176 could include a lock-up table to produce the appropriate pulse width modulated output to appropriately drive the air core meter 95.

Digital Display with User Prompts

Another important feature of the illustrated embodiment of FIGS. 4A and 4B of the present invention relates to the utilization of the digital readout 18. Since the microprocessor based circuitry 176 provides great flexibility insofar as programmable features, the digital display, in this embodiment, is adapted to display much more than simply the elapsed time of the racing event. To be sure, an alpha-numeric or other display could be used, and the microcontroller or microprocessor programmed to display setup or operational instructions to the driver, as well as error messages. The display could, alternatively, be programmed to display a digital readout of the instantaneous engine speed. Moreover, additional displays and drivers could be included, whereby the instantaneous engine speed as well as elapsed time or informational messages could be digitally displayed at the same time.

Lap Timer

Another important feature of an embodiment of the present invention relates to lap timing. The feature is utilized in racing vehicles intended to repeatedly travel around a closed-loop track (i.e., a lap). In connection with this feature, a lap indicator signal informs the tachometer at the completion of each lap. Upon receiving the lap indication signal, the controller 76 or microcontroller or microprocessor circuit 176 inserts a "marker" into memory. During replay of the racing event, as each lap "marker" is retrieved from memory, the tachometer display is halted. Specifically, the digital readout 18 displaying the elapsed time is halted, whereby the driver may observe an accurate display of the time for the completion of that lap.

The controller 76 or microcontroller or microprocessor circuit 176 is also adapted to insert a special code, or signal, into the output signal upon detecting the lap "marker" during replay. Specifically, when the output signal 48 is connected to a printer 51, the inserted code directs the printer 51 to print a lap indication mark (a special character indicative of the lap marker) at that point along the RPM recording curve. By noting the distance between successive lap indication markers, the driver can compute the lap time from an inspection of the printout. In a similar fashion, when the output signal 48 is connected to a computer 50, the computer may be appropriately programmed to display or otherwise provide this information.

It should be appreciated that the lap indicator signal, mentioned in connection with this lap timing feature, may be derived from any number of sources. For example, a switch may be provided in connection with the input controls 30, whereby the driver simply depresses the switch to indicate the completion of a lap. More sophisticated means may also be utilized. For example, a signal transmitted from the radio tower, or a transmitter operated by a crewman, or some other transmitter, may provide the lap indicator signal. This transmitted signal may then be received by a receiver provided in connection with the input controls. In this way, the lap indicator signal would be received and stored as a marker in memory in a manner completely transparent to the driver.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A high performance tachometer of the type having an input signal indicative of the vehicular engine speed and an output display for displaying the engine speed as indicated by the input signal, comprising in combination:

a memory device electronically connected to said input signal;

input controls for directing the control and operation of the tachometer;

triggering means for automatically indicating the start of the drag racing event and activating said memory in response thereto, said memory recording substantially the entirety of said racing event without being reset; and a controller that is electrically connected among the input controls, the memory device and the triggering means, said controller controlling and synchronizing the operation of the input controls, memory device, and triggering means.

2. The high performance tachometer of claim 1, further comprising a RPM switch coupled to said controller for controlling the operation of a plurality of external controlled devices, wherein one of the plurality of controlled devices is a shift light.

3. The high performance tachometer according to claim 2, further including a manual control switch operated by the driver to determine an operative preset speed at which to illuminate the shift light.

4. The high performance tachometer of claim 2 having an operative preset speed, wherein the operative preset speed is determined by the gear that the transmission is presently in.

5. The high performance tachometer according to claims 2, further including means for driving the output engine speeds.

* * * * *